United States Patent
Okumura

(10) Patent No.: US 9,365,101 B2
(45) Date of Patent: Jun. 14, 2016

(54) FLUID-FILLED VIBRATION DAMPING DEVICE

(71) Applicant: SUMITOMO RIKO COMPANY LIMITED, Komaki-shi, Aichi (JP)

(72) Inventor: Kei Okumura, Kakamigahara (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/600,631

(22) Filed: Jan. 20, 2015

(65) Prior Publication Data

US 2015/0219178 A1 Aug. 6, 2015

(30) Foreign Application Priority Data

Feb. 3, 2014 (JP) ................... 2014-018706

(51) Int. Cl.
*F16F 13/00* (2006.01)
*B60K 5/12* (2006.01)
*F16F 13/10* (2006.01)

(52) U.S. Cl.
CPC ............. *B60K 5/1208* (2013.01); *F16F 13/106* (2013.01)

(58) Field of Classification Search
CPC .................................. F16F 13/10; F16F 13/14
See application file for complete search history.

(56) References Cited

U.S. PATENT DOCUMENTS

| 6,364,295 | B1 * | 4/2002 | Wolf | F16F 13/26 267/140.14 |
| 6,499,729 | B1 * | 12/2002 | Walterbusch | F16F 13/10 267/140.13 |
| 8,246,022 | B2 | 8/2012 | Kojima | |
| 8,695,954 | B2 | 4/2014 | Ogawa et al. | |
| 2006/0043658 | A1 * | 3/2006 | Tanaka | F16F 13/10 267/140.13 |
| 2008/0246199 | A1 * | 10/2008 | Siemer | F16F 13/10 267/140.5 |
| 2012/0049428 | A1 * | 3/2012 | Moore | B60G 15/068 267/220 |
| 2012/0126090 | A1 * | 5/2012 | Kojima | F16F 13/10 248/636 |

FOREIGN PATENT DOCUMENTS

| JP | 2002-227912 A | 8/2002 |
| JP | 4945162 B2 | 6/2012 |
| JP | 5280923 B2 | 9/2013 |
| JP | 2013-245722 A | 12/2013 |

* cited by examiner

*Primary Examiner* — Robert A Siconolfi
*Assistant Examiner* — James Hsiao
(74) *Attorney, Agent, or Firm* — Oliff PLC

(57) ABSTRACT

A fluid-filled vibration damping device including a main rubber elastic body composed of a first rubber elastic body and a second rubber elastic body which are overlapped in an axial direction, and a pair of axis-perpendicular liquid chambers formed between the first and second rubber elastic bodies. A pair of dividing walls which divide the axis-perpendicular liquid chambers are constituted by a first division piece protruding from the first rubber elastic body and a second division piece protruding from the second rubber elastic body being overlapped in a circumferential direction. The first rubber elastic body has a thickness, diameter and spring constant all set larger than those of the second rubber elastic body, while having a tapered shape. With the device mounted on a vibration transmission system, a static support load is input so as to compress the first rubber elastic body.

6 Claims, 7 Drawing Sheets

FLUID-FILLED VIBRATION DAMPING DEVICE

INCORPORATED BY REFERENCE

The disclosure of Japanese Patent Application No. 2014-018706 filed on Feb. 3, 2014 including the specification, drawings and abstract is incorporated herein by reference in its entirety.

BACKGROUND OF THE INVENTION

1. Field of the Invention

The present invention relates to a fluid-filled vibration damping device to be used for an automotive engine mount and the like, especially to a bidirectional attenuation type fluid-filled vibration damping device capable of obtaining a vibration damping effect both in the axial and axis-perpendicular directions.

2. Description of the Related Art

Conventionally, there has been known a vibration damping device as a kind of vibration damping coupling body or a vibration damping supporting body interposed between the members constituting a vibration transmission system to connect said members to each other in a vibration damping manner. Further, as a vibration damping device, a fluid-filled vibration damping device using the vibration damping effect based on the flow action of a non-compressible fluid sealed therein is proposed, which is applied to an automotive engine mount and the like. This fluid-filled vibration damping device has a structure where a first mounting member and a second mounting member are elastically connected to each other by a main rubber elastic body, and a pressure-receiving chamber with its walls partially composed of said main rubber elastic body and an equilibrium chamber with its walls partially composed of a flexible film are each filled with a non-compressible fluid, while said pressure-receiving chamber and said equilibrium chamber are connected to each other by a first orifice passage. Then, a relative pressure difference is produced between the pressure-receiving chamber and the equilibrium chamber at the time of vibration input in the axial direction to generate a fluid flow through the first orifice passage, thus exerting the vibration effect based on the flow action of the fluid.

Also, as a fluid-filled vibration damping device, a device called a bidirectional attenuation type is proposed wherein the vibration damping function is effective against a vibration input not only in the axial direction but also in the axis-perpendicular direction. That is, as disclosed in Japanese Unexamined Patent Publication No. JP-A-2002-227912, the device has a structure where a pair of axis-perpendicular liquid chambers are formed on opposite sides of the first mounting member in the axis-perpendicular direction with a non-compressible fluid sealed therein, said axis-perpendicular liquid chambers being connected to each other by a second orifice passage. Then, in response to a vibration input in the axis-perpendicular direction, a relative pressure difference is produced between the pair of axis-perpendicular liquid chambers to generate a fluid flow through the second orifice passage so that the vibration damping effect based on the fluid flow action is exerted.

Meanwhile, the fluid-filled vibration damping device shown in JP-A-2002-227912 is made in a configuration where a thick outer wall (54) composing a main rubber elastic body (16) undergoes shear deformation under a load input in the axial direction to induce tensile stress. Therefore, with the device mounted on the vibration transmission system, if a static support load such as the one of a power unit is input in the axial direction all the time, it is so hard to maintain the durability of the device that the static support load has to be supported by another vibration damping device.

Thus, a structure is proposed as described in U.S. Pat. No. 8,695,954 where the device undergoes a compressive deformation under an input of the static support load in the axial direction so as to reduce or avoid the effect of tensile stress. That is, in U.S. Pat. No. 8,695,954, a main rubber elastic body (18) is configured by having a first rubber elastic body (24) and a second rubber elastic body (38) which are separate elements overlapped with each other in the axial direction, and the first and second rubber elastic bodies are each configured to be compressed at the time of an input of the static support load in the axial direction, while a pair of axis-perpendicular liquid chambers (102) are formed between the overlapping faces of the first and second rubber elastic bodies.

Also, in the structure of U.S. Pat. No. 8,695,954, the second rubber elastic body arranged on the inner side in the axial direction constituting the walls of a pressure-receiving chamber (42) is made thicker than the first rubber elastic body arranged on the outer side in the same direction so that the substantially effective piston surface area that causes pressure fluctuation in the pressure-receiving chamber under the vibration input in the axial direction is determined by the size of the second rubber elastic body. However, since the second rubber elastic body arranged on the inside has a smaller diameter than the first rubber elastic body arranged on the outside, the effective piston surface area corresponding to the input in the axial direction gets smaller and internal pressure fluctuations in the pressure-receiving chamber are small, posing a risk of reducing the vibration damping performance. Meanwhile, in the structure described in U.S. Pat. No. 8,695,954, once the effective piston surface area is secured large enough in order to ensure the vibration damping performance against the input in the axial direction, the outside diameter dimension of the fluid-filled vibration damping device gets increased, which causes problems such as gained weight and a larger space required for installation thereof and so forth.

SUMMARY OF THE INVENTION

The present invention was made against the background described above, and the problem to be solved is to provide a fluid-filled vibration damping device with a novel structure where durability is secured even when a static support load is input in the axial direction, while obtaining a vibration damping effect against a vibration input in the axial direction by a compact configuration in a favorably manner.

Aspects of the present invention made to solve such problem are described below. The components used in each of the following aspects can be adopted in any combination as possible.

That is, a first aspect of the present invention provides a fluid-filled vibration damping device comprising: a first mounting member and a second mounting member attached to respective members constituting a vibration transmission system; a main rubber elastic body elastically connecting the first and second mounting members to each other; a pressure-receiving chamber whose wall is partially constituted by the main rubber elastic body and which gives rise to internal pressure fluctuations at times of vibration input in an axial direction; an equilibrium chamber whose wall is partially constituted by a flexible film and which allows volume changes, the pressure-receiving chamber and equilibrium chamber being filled with a non-compressible fluid; a first orifice passage which connects the pressure-receiving chamber and the equilibrium chamber to each other; a pair of axis-perpendicular liquid chambers whose walls are partially constituted by the main rubber elastic body and which are formed on opposite sides of the first mounting member in an axis-perpendicular direction, the axis-perpendicular liquid chambers being filled with the non-compressible fluid; and a second orifice passage which connects the axis-perpendicular liquid chambers to each other, wherein the main rubber elastic body includes a first rubber elastic body and a second rubber elastic body which are separate elements from each other and overlapped in the axial direction, the axis-perpendicular liquid chambers are formed between the first and second rubber elastic bodies, a pair of dividing walls which divide the axis-perpendicular liquid chambers are constituted by at least one first division piece protruding from the first rubber elastic body toward the second rubber elastic body and at least one second division piece protruding from the second rubber elastic body toward the first rubber elastic body being overlapped in a circumferential direction, the first rubber elastic body has a thickness, diameter and spring constant all set larger than those of the second rubber elastic body, while having a tapered shape protruding outward in the axial direction, and with the device mounted on the vibration transmission system, a static support load is input between the first and second mounting members in a direction of getting closer to each other so as to compress the first rubber elastic body.

In the fluid-filled vibration damping device with the structure according to the first aspect described above, the first rubber elastic body is made thicker with a larger spring constant than the second rubber elastic body and is made in a tapered shape that protrudes outward in the axial direction. Therefore, the first rubber elastic body primarily undergoes compressive deformation at the time of an input of the static support load in the axial direction so that tensile stress acting on the first rubber elastic body is restricted to result in improvements of the durability of the device.

Further, since the first rubber elastic body is made thicker with a larger spring constant than the second rubber elastic body, the effective piston surface area of the pressure-receiving chamber corresponding to a vibration input in the axial direction is determined by the size of the first rubber elastic body that is made thicker. Under the circumstances, since the first rubber elastic body is made with a larger diameter than that of the second rubber elastic body, the effective piston surface area is secured large enough to efficiently cause the pressure fluctuation in the pressure-receiving chamber, whereby the vibration damping effect of the first orifice passage is favorably exerted.

A second aspect of the present invention provides the fluid-filled vibration damping device according to the first aspect, wherein a protrusion tip of the first division piece is separated from the second rubber elastic body, while a protrusion tip of the second division piece is separated from the first rubber elastic body.

According to the second aspect, the protrusion tips of the first and second division pieces are prevented from being constrained to make elastic deformation of the division pieces more likely to be allowed. Therefore, when vibration of higher frequency than the tuning frequency of the second orifice passage is input in the axis-perpendicular direction, a significant increase in the dynamic spring in the axis-perpendicular direction caused by antiresonance of the second orifice passage and so forth is prevented by elastic deformation of the first and second division pieces, thus enabling to obtain effective vibration damping performance.

A third aspect of the present invention provides the fluid-filled vibration damping device according to the first or second aspect, wherein the first division piece and the second division piece which constitute the dividing wall are separated from each other in the circumferential direction, and a space is formed between overlapping faces of the first and second division pieces.

According to the third aspect, since a slight elastic deformation of the first and second division pieces in the circumferential direction is easily allowed by the space between the overlapping faces thereof, vibration damping effect due to the lowered dynamic spring is favorably exerted.

Also, by connecting the space between the overlapping faces at the sides of the protrusion tips of the first and second division pieces to communicate it with the pair of axis-perpendicular liquid chambers, a communication passage can be formed that communicates the pair of axis-perpendicular liquid chambers with each other. According to this, an increase in the dynamic spring is prevented by generating a flow of fluid through the communication passage between the pair of axis-perpendicular liquid chambers in response to the vibration input at a frequency that substantially closes the second orifice passage, for example, thus enabling to obtain effective vibration isolation effect.

A fourth aspect of the present invention provides the fluid-filled vibration damping device according to any one of the first to third aspects, wherein overlapping faces of the first division piece and the second division piece are inclined toward a direction of protrusion thereof, and the first and second division pieces are gradually thinned out toward each protruding tip.

According to the fourth aspect, by having the first and second division pieces gradually thinned out toward each protruding tip, the demolding after molding is made easy. Also, when the communication passage is provided that communicates the pair of axis-perpendicular liquid chambers with each other between the overlapping faces of the first and second division pieces, a fluid flow is generated smoothly in the communication passage by the overlapping faces between the first and second division pieces being inclined, thus efficiently exerting the vibration damping effect.

A fifth aspect of the present invention provides the fluid-filled vibration damping device according to any one of the first to fourth aspects, wherein at least one of the at least one first division piece and the at least one second division piece of the dividing wall comprises a plurality of division pieces, and the first division piece and the second division piece are alternately arranged and overlapped in the circumferential direction.

According to the fifth aspect, since the pair of axis-perpendicular liquid chambers can be partitioned to a higher degree and relative pressure fluctuation thereof can be caused more efficiently when the vibration is input in the axis-perpendicular direction, a vibration damping effect can be obtained more effectively due to the second orifice passage and the like. Also, when a communication passage is formed to extend between the overlapping faces of the first and second division pieces, the communication passage can be formed long enough in a narrow circumferential region, thus increasing the degree of freedom in tuning the vibration damping characteristics.

A sixth aspect of the present invention provides the fluid-filled vibration damping device according to any one of the first to fifth aspects, wherein the first division piece is overlapped with the second division piece for not less than half of its protrusion length, while the second division piece is overlapped with the first division piece for not less than half of its protrusion length.

According to the sixth aspect, the first and second division pieces are held overlapped with each other in a stable condition even if each of them is thinned out so that short circuit or the like between the pair of axis-perpendicular liquid chambers can be prevented. Also, if the communication passage that communicates the pair of axis-perpendicular liquid chambers with each other is formed to extend between the overlapping faces of the first and second division pieces, the length of the communication passage can be secured large enough efficiently.

According to the present invention, the main rubber elastic body is configured by the first rubber elastic body and the second rubber elastic body made separately from each other, and by forming the pair of axis-perpendicular liquid chambers between the first and second rubber elastic bodies, the vibration damping effect is exerted based on the fluid flow action not only in the axial direction but also in the axis-perpendicular direction. In addition, since the first rubber elastic body is made thicker with a larger spring constant than the second rubber elastic body, while the first rubber elastic body is made in a tapered shape that protrudes outward in the axial direction, enough durability is maintained even if static support load is input in the axial direction. Further, due to the thick wall of the first rubber elastic body, the effective piston surface area of the pressure-receiving chamber corresponding to a vibration input in the axial direction is determined by the size of the first rubber elastic body, while the first rubber elastic body is made larger in diameter than the second rubber elastic body so that the effective piston surface area of the pressure-receiving chamber is secured large enough, thus improving the vibration damping performance against the vibration input in the axial direction.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
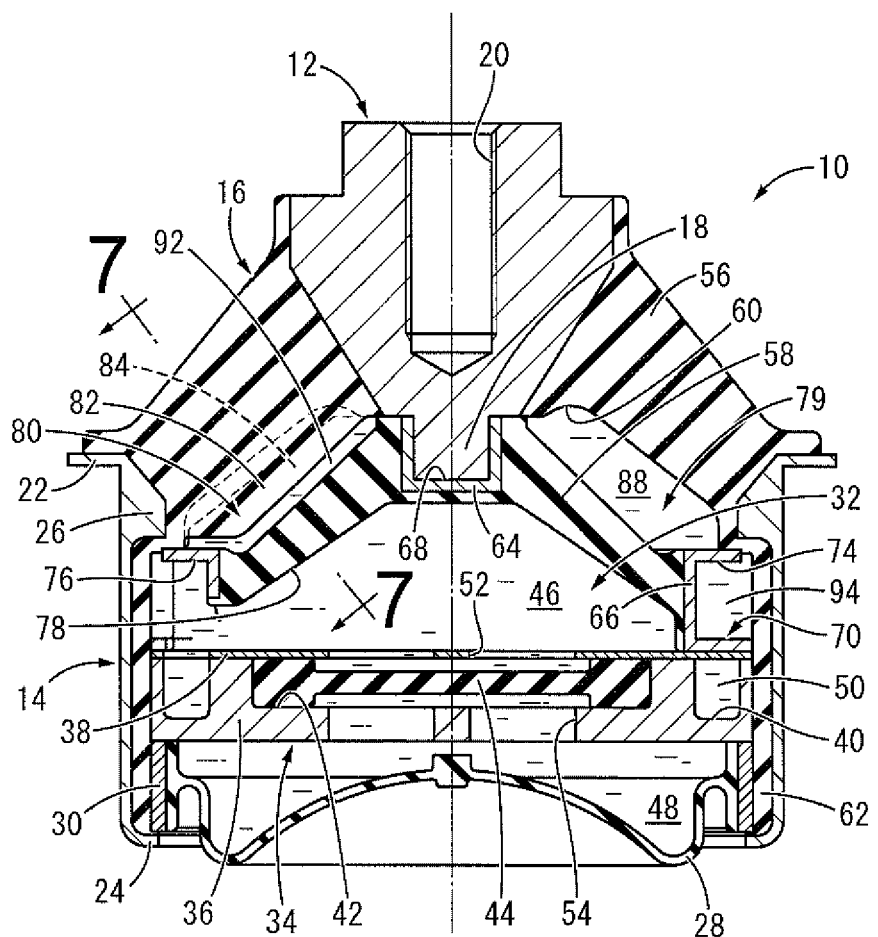
FIG. 1 is a vertical cross section view showing a fluid-filled vibration damping device in the form of an engine mount as a first embodiment of the present invention, taken along line 1-1 of FIG. 5.

FIG. 1 shows an automotive engine mount 10 as a first embodiment of the fluid-filled vibration damping device with the structure according to the present invention. The engine mount 10 has a structure where a first mounting member 12 and a second mounting member 14 are elastically connected by a main rubber elastic body 16. In the following descriptions, the up-down direction generally means the up-down direction in FIG. 1, which is the axial direction of the mount and also the vertical direction with the device mounted on a vehicle.

More specifically, the first mounting member 12 is a high rigidity member formed with iron or aluminum alloy or the like with its upper portion in an approximate shape of a cylinder, while its lower portion in an approximate shape of a reverse truncated cone that reduces its diameter downward. In addition, the first mounting member 12 is integrally formed with a fitting convex portion 18 in a shape of small-diameter cylinder protruding downward. Further, on the first mounting member 12, a screw hole 20 is formed to open to the top face thereof extending linearly along the central axis.

The second mounting member 14 is a high rigidity member similar to the first mounting member 12 in an approximate shape of a thin and large-diameter cylinder. Also, at the top edge of the second mounting member 14, an upper flange 22 is integrally formed protruding toward the outer periphery while a lower flange 24 is integrally formed at the bottom edge protruding toward the inner periphery. In addition, at the top edge of the second mounting member 14, an inner peripheral protrusion 26 is integrally formed protruding toward the inner periphery, where the top edge of the second mounting member 14 is partially made thicker.

Then, the first mounting member 12 is arranged above the second mounting member 14 on the same central axis, and the first mounting member 12 and the second mounting member 14 are elastically connected to each other by the main rubber elastic body 16.

Also, a flexible film 28 is attached to the second mounting member 14. The flexible film 28 is composed of a thin film made of rubber elastic body or elastomer or the like in an approximate shape of a circular plate and is made to readily allow deformation by having a given slack. Also, along the outer periphery of the flexible film 28, a fixing member 30 in an annular shape is vulcanization-bonded where the fixing member 30 is inserted into the bottom portion of the second mounting member 14, while the flexible film 28 is attached to close the lower opening of the second mounting member 14 by having the second mounting member 14 treated with a diameter-reducing process.

By attaching the flexible film 28 to the second mounting member 14 in this way, a fluid chamber 32 separated fluid-tightly from outside is formed between the main rubber elastic body 16 and the flexible film 28 in the axial direction where a non-compressible fluid is sealed in. The non-compressible fluid sealed in the fluid chamber 32 is not particularly limited but, for example, water, alkylene glycol, polyalkylene glycol, ethylene glycol, silicone oil, or a mixture liquid thereof, and more preferably, a low-viscosity fluid of 0.1 Pa·s or lower can be adopted.

Also, a partition member 34 is attached to the second mounting member 14. The partition member 34 is in an approximate shape of a circular plate with a structure where a partition member main body 36 is overlapped with a cover plate 38. The partition member main body 36 is a hard member formed with metal or synthetic resin where a first peripheral groove 40 is formed along the outer periphery extending in the circumferential direction for less than one round opening to the top face. Meanwhile a containing recess 42 in a circular shape is formed at the center so as to open to the top face. On the top face of the partition member main body 36, the cover plate 38 in a shape of a thin circular plate is overlapped, while a movable film 44 is arranged in the containing recess 42 covered by the cover plate 38. The movable film 44 is an elastic body in an approximate shape of a circular plate where its outer periphery is made thicker and held between the partition member main body 36 and the cover plate 38, while the center portion thereof is made elastically deformable within the containing recess 42 in the up-down direction, which is the thickness direction.

The partition member 34 with the structure described above is arranged to extend in the axis-perpendicular direction within the fluid chamber 32, and the outer peripheral face thereof is abutted against the second mounting member 14 to be supported thereby, while the outer peripheral edge is held between the fixing member 30 and the inner peripheral protrusion 26 of the second mounting member 14 in the axial direction. This allows the fluid chamber 32 to be divided into the upper and lower sides of the partition member 34, and above the partition member 34, formed is a pressure-receiving chamber 46 whose wall is partially constituted by the main rubber elastic body 16 and which gives rise to internal pressure fluctuations at times of vibration input in the axial direction. Besides, below the partition member 34, formed is an equilibrium chamber 48 whose wall is partially constituted by a flexible film 28 and which allows volume changes. The pressure-receiving chamber 46 and the equilibrium chamber 48 are each filled with a non-compressible fluid.

Also, the upper opening of the first peripheral groove 40 is covered by the cover plate 38, while two ends of the first peripheral groove 40 are communicated with the respective pressure-receiving chamber 46 and equilibrium chamber 48, and a first orifice passage 50 is formed using the first peripheral groove 40 to communicate the pressure-receiving chamber 46 and the equilibrium chamber 48 with each other. The first orifice passage 50 has the tuning frequency, which is the resonance frequency of the fluid flowing therethrough, set to a low frequency of about 10 Hz, that corresponds to engine shake, by means of setting the ratio (A/L) of the passage cross-sectional area (A) to the passage length (L) as appropriate.

In addition, on the top face of the movable film 44, liquid pressure of the pressure-receiving chamber 46 is applied via an upper through-hole 52 penetrating through the cover plate 38, while on the bottom face of the movable film 44, liquid pressure of the equilibrium chamber 48 is applied via a lower through-hole 54 penetrating through the partition member main body 36. This allows liquid pressure in the pressure-receiving chamber 46 to be transmitted to and absorbed by the equilibrium chamber 48 due to a slight elastic deformation of the movable film 44 in the thickness direction at the time of a small-amplitude vibration input in the axial direction. The elastic deformation of the movable film 44 in the thickness direction is made to occur actively under a resonance condition at a higher frequency than the tuning frequency of the first orifice passage 50, and the resonance frequency is set at a middle to high frequency at the same level as idling vibration or muffled sound of a running vehicle, for example.

Meanwhile, the main rubber elastic body 16 has a structure where a first rubber elastic body 56 and a second rubber elastic body 58 are vertically overlapped in the axial direction.

Figure 2:
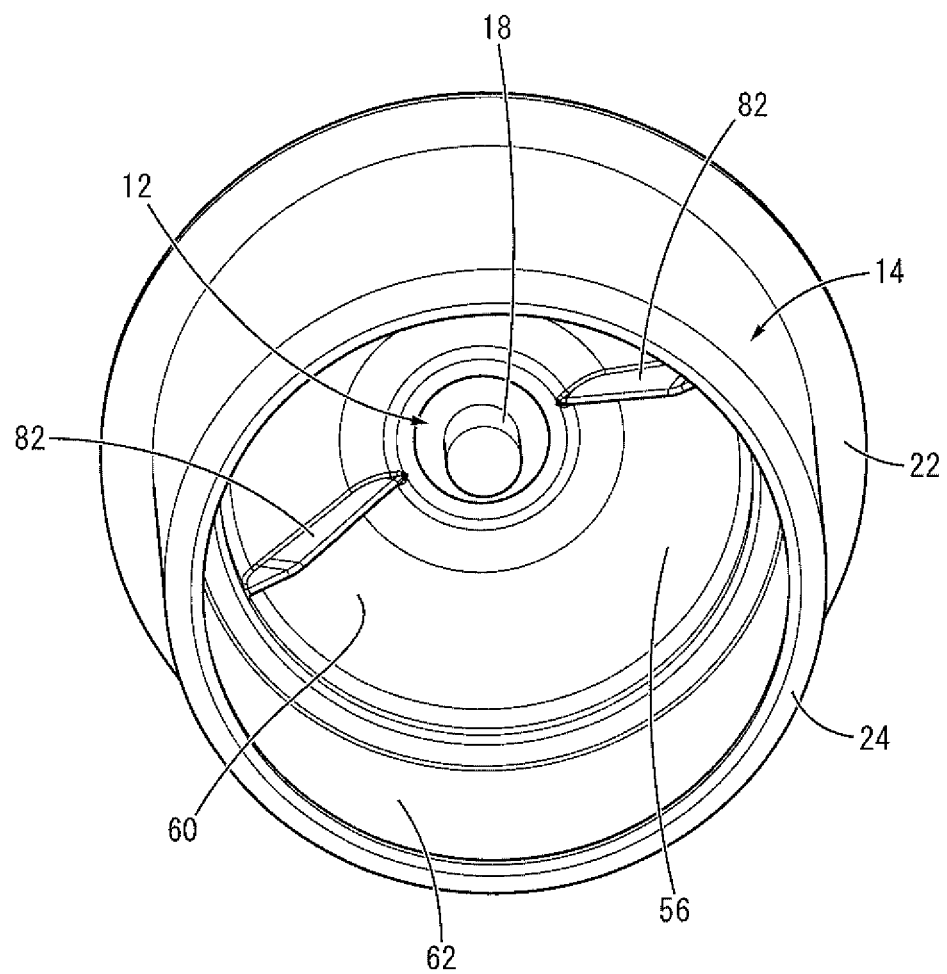
FIG. 2 is a perspective view showing an integrally vulcanization molded component of a first rubber elastic body constituting the engine mount shown in FIG. 1.
Figure 3:
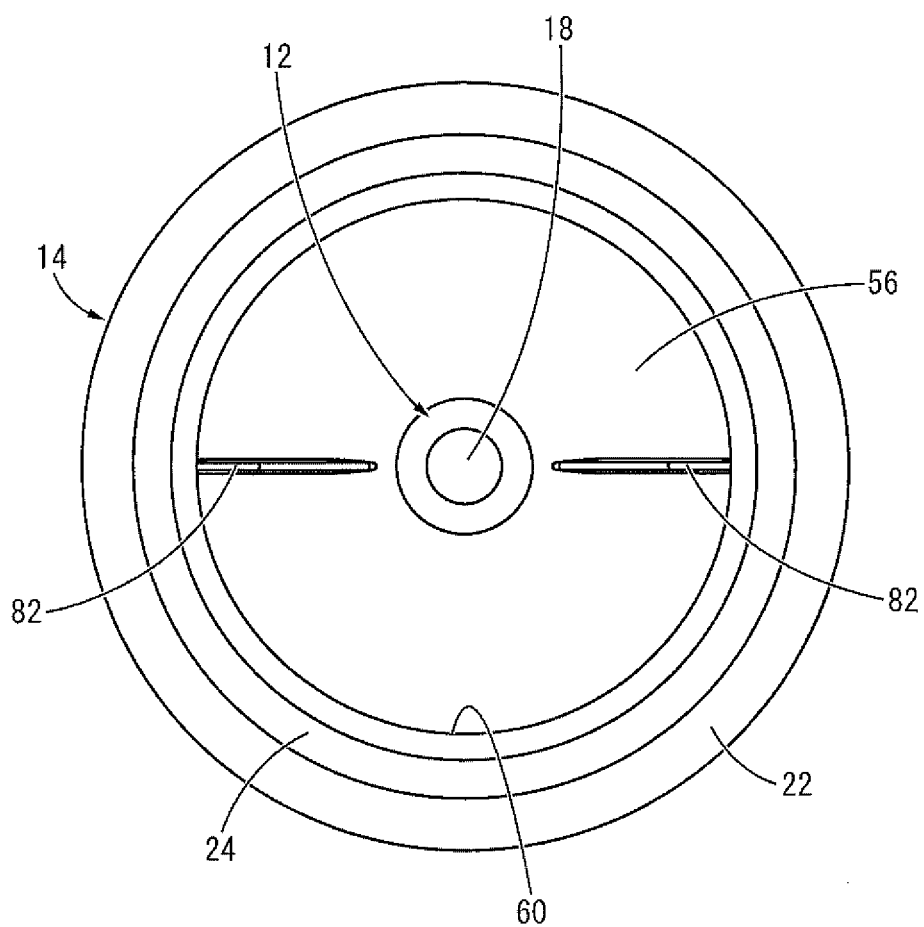
FIG. 3 is a bottom view of the integrally vulcanization molded component of the first rubber elastic body shown in FIG. 2.

The first rubber elastic body 56, as shown in FIGS. 1 to 3, is in an approximate shape of a thick truncated cone with its inner peripheral face at the small-diameter end vulcanization-bonded to the first mounting member 12, while the outer peripheral face at the large-diameter end vulcanization-bonded to the second mounting member 14. The first rubber elastic body 56 is formed as an integrally vulcanization molded component provided with the first mounting member 12 and the second mounting member 14.

In addition, a first large-diameter recess 60 is formed in the first rubber elastic body 56. The first large-diameter recess 60 is a concave in an approximate shape of a reverse bowl opening onto the large-diameter end face of the first rubber elastic body 56. This allows the outer and inner faces of the first rubber elastic body 56 to be formed in a tapered form with the diameter decreasing upward, and the first rubber elastic body 56 is made in a tapered shape protruding upward.

Further, at the peripheral edge of the first rubber elastic body 56, a sealing rubber layer 62 is integrally formed. The sealing rubber layer 62 is in an approximate shape of a thin and large-diameter cylinder extending downward from the first rubber elastic body 56 on the outer periphery side of the first large-diameter recess 60 that covers an approximately entire inner peripheral face of the second mounting member 14.

Meanwhile, the second rubber elastic body 58, as shown in FIGS. 1, 4, 5 and 6, is in an approximate shape of a truncated cone with its diameter smaller than that of the first rubber elastic body 56, and a first connecting member 64 is vulcanization-bonded to the small-diameter end, while a second connecting member 66 is vulcanization-bonded to the large-diameter end thereof. The second rubber elastic body 58 is formed as an integrally vulcanization molded component provided with the first connecting member 64 and the second connecting member 66.

The first connecting member 64 is a hard member in an approximate shape of a small-diameter bottomed cylinder, wherein a fitting concave portion 68 externally fittable to the fitting convex portion 18 of the first mounting member 12 is formed opening upward. The second connecting member 66 is an annular hard member extending continuously around the circumference, wherein an annular groove 70 opening to the outer peripheral face is formed all along the periphery. From the annular groove 70, a pair of edge wall portions 72, 72 integrally formed with the second rubber elastic body 58 protrude out, and a second peripheral groove 74 is formed along one peripheral part between the pair of edge wall portions 72, 72 extending for just short of one round in the circumferential direction, while along the other peripheral part between them, a communication recess 76 is formed opening toward the outer periphery.

Moreover, a second large-diameter recess 78 is formed in the second rubber elastic body 58. The second large-diameter recess 78 is a concave in an approximate shape of a reverse bowl opening onto the large-diameter end face of the second rubber elastic body 58. This makes the second rubber elastic body 58 in a tapered shape with its outer and inner peripheral faces each reducing the diameter upward.

Then, the fitting convex portion 18 of the first mounting member 12 is fitted into the fitting concave portion 68 of the first connecting member 64, while the second connecting member 66 is held between the inner peripheral protrusion 26 of the second mounting member 14 and the partition member 34 in the axial direction. This allows the first mounting member 12 and the second mounting member 14 to be elastically connected to each other by the second rubber elastic body 58, while the first rubber elastic body 56 and the second rubber elastic body 58 are vertically overlapped in the axial direction.

Under these circumstances, the first rubber elastic body 56 is made thicker than the second rubber elastic body 58, and the spring constant of the first rubber elastic body 56 in response to the input in the axial direction is set larger than that of the second rubber elastic body 58. In addition, the first rubber elastic body 56 is made with a larger diameter than that of the second rubber elastic body 58 so that the second rubber elastic body 58 is inserted into the first large-diameter recess 60 of the first rubber elastic body 56.

Also, the second rubber elastic body 58 is overlapped with the lower portion of the first rubber elastic body 56, and between the overlapping faces of the first rubber elastic body 56 and the second rubber elastic body 58, an annular region 79 is formed where a non-compressible fluid is sealed in. The non-compressible fluid sealed in the annular region 79 is similar to the one sealed in the fluid chamber 32.

Further, the annular region 79 is divided by a pair of dividing walls 80, 80. Each dividing wall 80 is configured by overlapping a first division piece 82 integrally formed with the first rubber elastic body 56 and a second division piece 84 integrally formed with the second rubber elastic body 58 in the circumferential direction.

Figure 7:
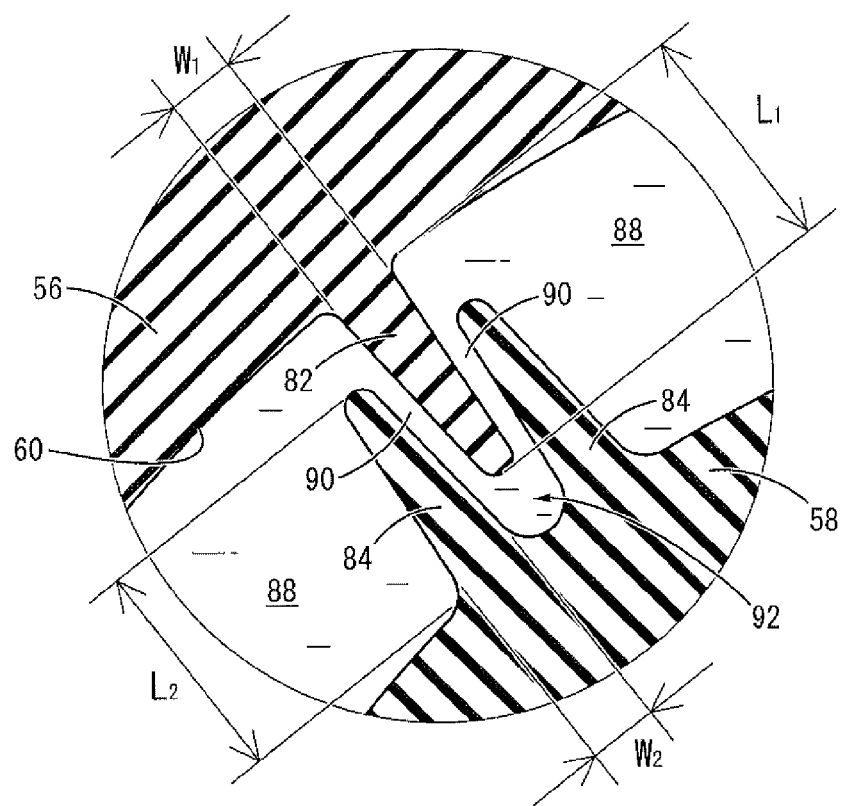
FIG. 7 is a fragmentary enlarged cross section view of a principle part of the engine mount shown in FIG. 1, taken along line 7-7 of FIG. 1.

The first division piece 82, as shown in FIGS. 2 and 3, has a thin plate shape and formed in a pair opposing each other in one radial direction, and each protrudes from the inner face of the first large-diameter recess 60 of the first rubber elastic body 56. In addition, both sides of the first division piece 82 are inclined against the direction of protrusion to make slopes getting closer to each other toward the protrusion tip so that the first division piece 82 is gradually thinned out toward the protrusion tip. Further, the protrusion tip of the first division piece 82 is made in a tapered shape approximately corresponding to the outer peripheral face of the second rubber elastic body 58. Also, the ratio ($L_1/W_1$) of the protrusion length ($L_1$) to the maximum thickness ($W_1$) of the first division piece 82 is preferably set at 2 or more, and more preferably at 3 or more, and the first division piece 82 has a flat plate shape (see FIG. 7).

Figure 4:
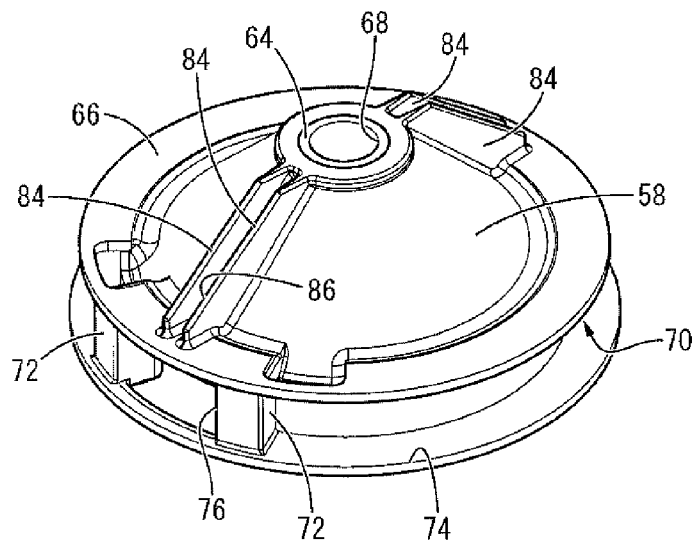
FIG. 4 is a perspective view showing an integrally vulcanization molded component of a second rubber elastic body constituting the engine mount shown in FIG. 1.
Figure 5:
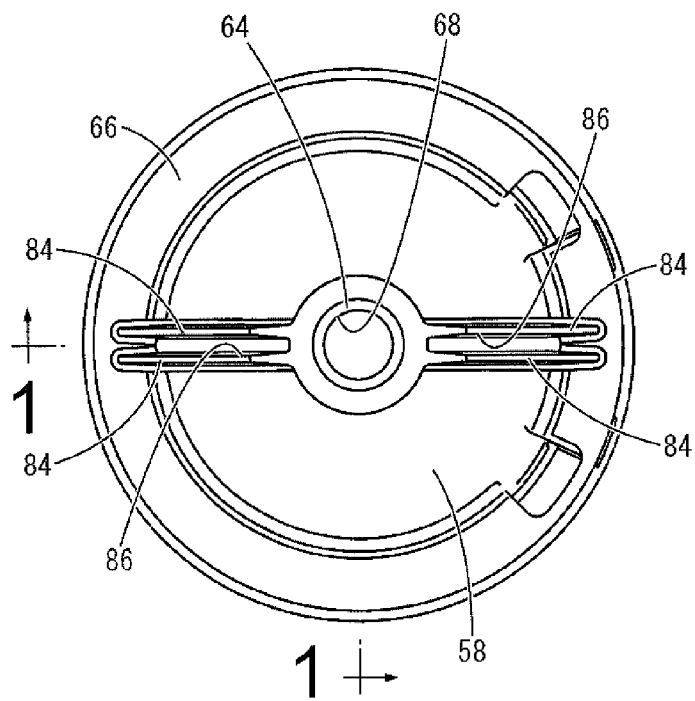
FIG. 5 is a plan view of the integrally vulcanization molded component of the second rubber elastic body shown in FIG. 4.
Figure 6:
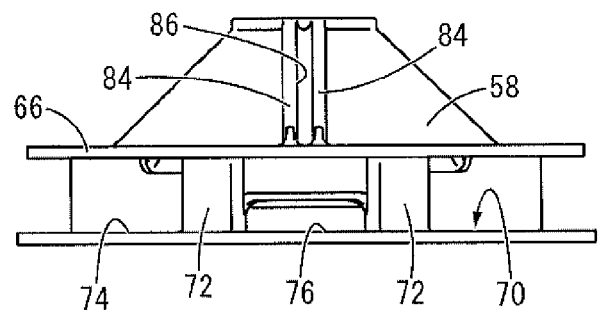
FIG. 6 is a left side view of the integrally vulcanization molded component of the second rubber elastic body shown in FIG. 5.

The second division piece 84, as shown in FIGS. 4 to 6, has a thin plate shape and two of them are formed to extend in approximately parallel manner protruding out of the outer periphery of the second rubber elastic body 58, and two pairs of them are arranged at locations opposing to each other in one radial direction. In addition, both sides of the second division piece 84 are inclined against the direction of protrusion to make slopes getting closer to each other toward the protrusion tip so that the second division piece 84 is gradually thinned out toward the protrusion tip. Further, the protrusion tip of the second division piece 84 is made in a tapered shape approximately corresponding to the inner peripheral face of the first large-diameter recess 60 of the first rubber elastic body 56. Also, the ratio ($L_2/W_2$) of the protrusion length ($L_2$) to the maximum thickness ($W_2$) of the second division piece 84 is preferably set at 2 or more, and more preferably at 3 or more, and the second division piece 84 has a flat plate shape (see FIG. 7).

The deformation rigidity, or spring property, of the second division piece 84 is preferably made approximately equal to that of the first division piece 82. This enables to surely avoid the problems such that only either of the division pieces 82, 84 is deformed greatly to make it hard to perform the wall dividing function in a stable manner when they get in touch with each other due to the pressure in the pair of axis-perpendicular liquid chambers 88, 88 described later. More specifically, it is preferable that the deformation rigidity, or spring property, of the first division piece 82 and the second division piece 84 do not differ from each other by more than twice, and more preferably, they do not differ by more than 1.5 times. In other words, it is suitable that the thickness and protrusion dimension of the first division piece 82 and the second division piece 84 be set nearly equal to each other ($W_1 \approx W_2$, $L_1 \approx L_2$), namely, for example, the difference therebetween be set not more than twice, and more preferably not more than 1.5 times ($0.5*W_2 \leq W_1 \leq 2*W_2$, $0.5*L_2 \leq L_1 \leq 2*L_2$).

Further, the two second division pieces 84, 84 constituting the dividing wall 80, as shown in FIG. 5, are arranged in opposition to each other at a given distance in the circumferential direction, and between the two second division pieces 84, 84 in the circumferential direction, a linear insertion groove 86 is formed opening toward the outer periphery.

Then, by having the first rubber elastic body 56 and the second rubber elastic body 58 overlapped with each other in the axial direction, the first division piece 82 protrudes from the first rubber elastic body 56 toward the second rubber elastic body 58, while the second division piece 84 protrudes from the second rubber elastic body 58 toward the first rubber elastic body 56. This allows the first division piece 82 to be inserted between the second division pieces 84, 84 in the circumferential direction (insertion groove 86), while the first division piece 82 and the second division pieces 84, 84 to be overlapped with each other in the circumferential direction to constitute the dividing wall 80.

Moreover, the first division piece 82 and the second division pieces 84, 84 are formed at two locations on the circumference opposing each other in the radial direction, where each dividing wall 80 is formed. This allows the annular region 79 formed between the first rubber elastic body 56 and the second rubber elastic body 58 to be divided by the two dividing walls 80, 80 in the circumferential direction, so as to form a pair of axis-perpendicular liquid chambers 88, 88 whose walls are partially constituted by the main rubber elastic body 16. The pair of axis-perpendicular liquid chambers 88, 88 are each filled with a non-compressible fluid. In the present embodiment, these dividing walls 80, 80 are positioned in the left-right direction of the vehicle with the engine mount 10 mounted on the vehicle (which is described later) to allow the pair of axis-perpendicular liquid chambers 88, 88 to be arranged on opposite sides of the first mounting member 12 to oppose each other in the front-back direction of the vehicle.

In the present embodiment, the first division piece 82 and the second division pieces 84, 84 are separated from each other in the circumferential direction, and between overlapping faces of the first division piece 82 and each of the second division pieces 84, 84, a space 90 is formed. In addition, in the present embodiment, the protrusion tip of the first division piece 82 is separated outward from the second rubber elastic body 58, while the protrusion tip of the second division piece 84 is separated inward from the first rubber elastic body 56. This allows the spaces 90, 90 between the overlapping faces of the first division piece 82 and the second division pieces 84, 84 to be communicated with each other on the tip side of the first division piece 82, while these spaces 90, 90 to be communicated with each of the pair of axis-perpendicular liquid chambers 88, 88 on the tip side of the second division pieces 84, 84, thus forming a communication passage 92 that communicates the pair of axis-perpendicular liquid chambers 88, 88 with each other.

Further, not less than half of the protrusion length of the first division piece 82 from the tip thereof is overlapped with the second division pieces 84, 84 in the circumferential direction, while not less than half of the protrusion length of each of the second division pieces 84, 84 from the tip thereof is overlapped with the first division piece 82 in the circumferential direction.

Also, the second peripheral groove 74 of the second connecting member 66 is covered fluid-tightly by the second mounting member 14 at the opening on the outer peripheral side, while two ends thereof in the circumferential direction are communicated with the respective axis-perpendicular liquid chambers 88, 88, whereas a second orifice passage 94 that communicates the pair of axis-perpendicular liquid chambers 88, 88 with each other is formed using the second peripheral groove 74. The first orifice passage 50 is communicated with the pressure-receiving chamber 46 via the communication recess 76 of the second connecting member 66 at a location off the second orifice passage 94 in the circumferential direction.

The engine mount 10 with the structure described above, as shown in FIG. 8, is made to be installed on a vehicle. That is, the first mounting member 12 is mounted to a power unit 98, which is one of the members constituting the vibration transmission system, via an inner bracket 96 that is fixed by a bolt 95 screwed into the screw hole 20, while the second mounting member 14 is mounted to a vehicular body 102, which is the other member constituting the vibration transmission system, via an outer bracket 100 that is fitted thereto from outside. This allows the power unit 98 to be supported by the vehicular body 102 via the engine mount 10 in a vibration damping manner.

Figure 8:
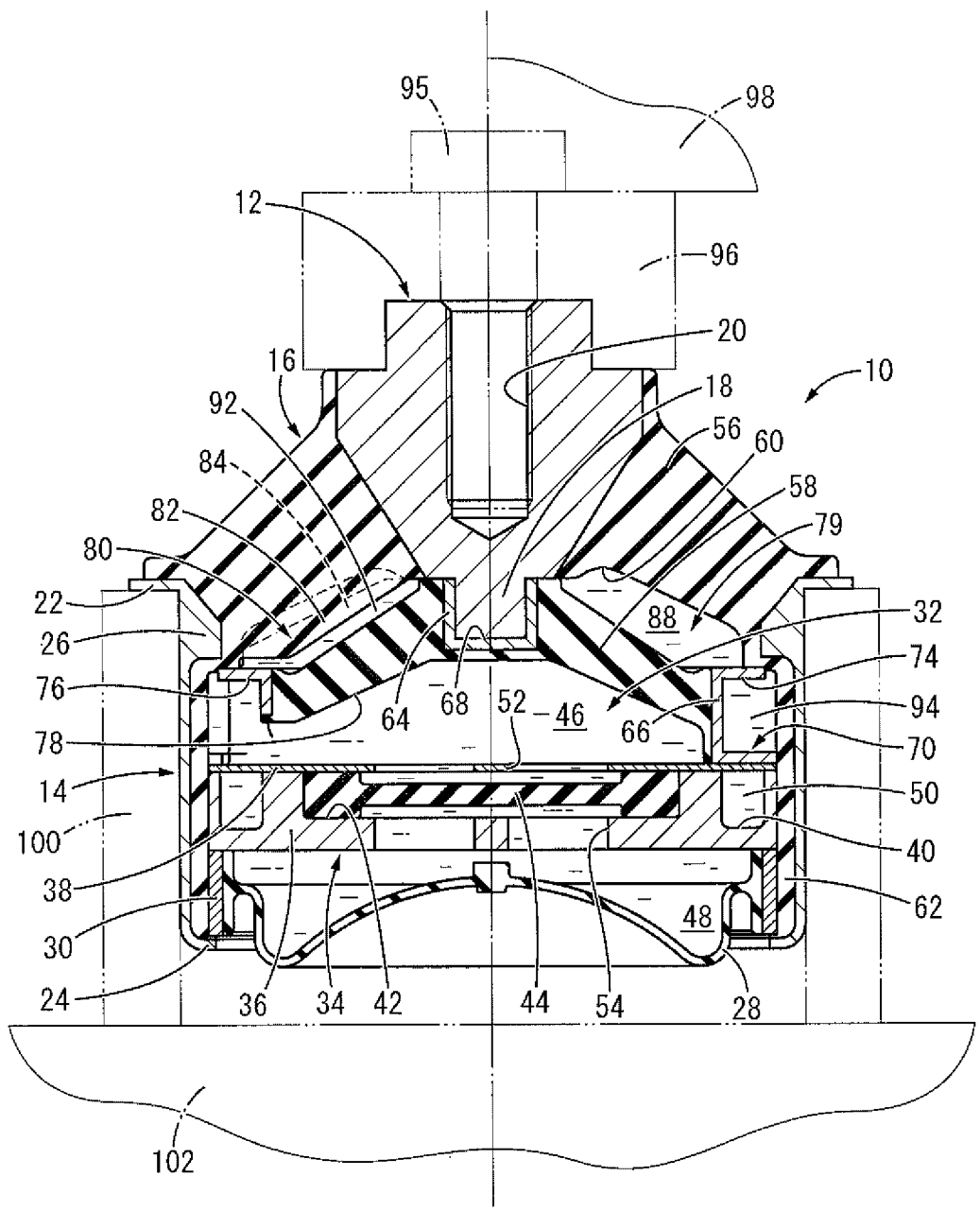
FIG. 8 is a vertical cross section view showing a state with the engine mount shown in FIG. 1 mounted on a vehicle.

Also, with the device mounted on the vehicle, since the shared support load of the power unit 98 is entered into the engine mount 10 in the axial (up-down) direction, the first mounting member 12 and the second mounting member 14 are relatively displaced in the axial direction to get closer to each other due to the elastic deformation of the main rubber elastic body 16. In the engine mount 10, the first rubber elastic body 56 and the second rubber elastic body 58 constituting the main rubber elastic body 16 are each made in an approximate shape of a truncated cone protruding upward so that both the first and second rubber elastic bodies 56, 58 undergo compression deformation by input of the static shared support load. Since the first rubber elastic body 56 is made thicker with a larger spring constant than the second rubber elastic body 58, the shared support load of the power unit 98 entered into the engine mount 10 is supported mainly by the first rubber elastic body 56 so as to apply compression thereto. Also, as shown in FIG. 8, the first and second rubber elastic bodies 56, 58 are in an approximate shape of a truncated cone protruding upward even under a condition of compressive deformation by the static shared support load.

Then, with the device mounted on the vehicle, when a low-frequency, large-amplitude vibration equivalent to engine shake is input in the axial direction, relative difference of liquid pressure is caused between the pressure-receiving chamber 46 and the equilibrium chamber 48 so that a fluid flow is generated via the first orifice passage 50 between the pressure-receiving chamber 46 and the equilibrium chamber 48. This enables to exert the intended vibration damping effect (high-attenuation effect) based on the flow action of the fluid.

In the engine mount 10 of the present embodiment, the first rubber elastic body 56 is made thicker with a larger spring constant than the second rubber elastic body 58 so that the effective piston diameter that causes internal pressure fluctuation in the pressure-receiving chamber 46 at the time of vibration input in the axial direction is determined by the inner diameter of the first rubber elastic body 56, which has a larger spring constant. Under these circumstances, since the first rubber elastic body 56 is made larger in diameter than the second rubber elastic body 58, the effective piston surface area of the pressure-receiving chamber 46 corresponding to the vibration input in the axial direction is secured large enough. Therefore, the relative pressure difference between the pressure-receiving chamber 46 and the equilibrium chamber 48 is efficiently generated, thus enabling to obtain the vibration damping effect based on the flow action of the fluid more favorably.

Also, a middle- to high-frequency, small-amplitude vibration equivalent to idling vibration or muffled sound of a running vehicle is once input in the axial direction, the first orifice passage 50 is closed due to antiresonance, while the liquid pressure absorption effect is exerted by elastic deformation of the movable film 44. Therefore, substantial fluid tightness of the pressure-receiving chamber 46 is avoided, thus enabling to exert the intended vibration damping effect (low dynamic spring effect).

Also, if a low-frequency vibration with relatively large amplitude is input in the front-rear direction of the vehicle when it overrides bumps on the road etc., relative pressure difference is generated between the pair of axis-perpendicular liquid chambers 88, 88 so that a fluid flow is generated via the second orifice passage 94 between the axis-perpendicular liquid chambers 88, 88. As evident from this, the engine mount 10 is made to be a bidirectional attenuation type fluid-filled vibration damping device that exerts a valid vibration damping effect in response to the vibration input in the up-down direction as well as the front-rear direction.

In the engine mount 10 of the present embodiment, the first division piece 82 and the second division pieces 84, 84 are overlapped with each other in the circumferential direction with spaces 90, 90 in between. Then, once a large-amplitude vibration is input in the front-rear direction, the first division piece 82 and the second division pieces 84, 84 are elastically deformed in the thickness direction based on the relative pressure difference between the pair of axis-perpendicular liquid chambers 88, 88 to let the overlapping faces of the first division piece 82 and the second division pieces 84, 84 abut against each other. This results in closure of the communication passage 92 to restrict the fluid flow through the communication passage 92 so that a fluid flow is efficiently caused via the second orifice passage 94, thus enabling to obtain the intended vibration damping effect in a favorable manner.

Especially in the present embodiment, since the first division piece 82 and the second division pieces 84, 84 are both thinning out toward the protrusion tip, the first and second division pieces 82, 84, 84 readily undergo elastic deformation due to the liquid pressure difference between the pair of axis-perpendicular liquid chambers 88, 88 and the lowered pressure caused by the change in the flow rate in the communication passage 92 or the like. Therefore, the communication passage 92 is promptly closed at the time of large-amplitude vibration input when the relative pressure difference between the pair of axis-perpendicular liquid chambers 88, 88 is increased, thus enabling to obtain the vibration damping effect by the second orifice passage 94 in a more favorable manner.

Also, once a middle- to high-frequency vibration with relatively small amplitude is input in the front-rear direction of the vehicle, a fluid flow is generated between the pair of axis-perpendicular liquid chambers 88, 88 via the communication passages 92, 92 provided in the dividing walls 80, 80.

This avoids the closure of the pair of axis-perpendicular liquid chambers 88, 88 even if the second orifice passage 94 is substantially closed due to antiresonance, thus enabling to obtain the vibration damping effect by lowered dynamic spring.

In the present embodiment, the second division piece 84 is overlapped with the first division piece 82 on its each side in the circumferential direction, and the first division piece 82 and the second division pieces 84, 84 are overlapped with each other for not less than half of the protrusion length from the protrusion tip. This makes it difficult to release the overlap between the first and second division pieces 82, 84, 84 to avoid any short circuit between the pair of axis-perpendicular liquid chambers 88, 88, thus enabling to obtain the intended vibration damping effect in a stable manner even if the thin-walled first and second division pieces 82, 84, 84 are employed. In addition, the communication passage 92 that extends between the overlapping faces of the first and second division pieces 82, 84, 84 is provided with a significant passage length securely to obtain an excellent vibration damping effect.

Further, since both sides of the first division piece 82 and the second division piece 84 are inclined against the direction of protrusion to make slopes getting closer to each other toward the protrusion tip, the sealed-in liquid can flow through the communication passage 92 with a small resistance, thus enabling to obtain the intended vibration damping effect in an efficient manner.

Also, by making slopes on both sides of the first division piece 82 and the second division piece 84, demolding is made easier for the first rubber elastic body 56 provided with the first division piece 82 and the second rubber elastic body 58 provided with the second division piece 84 when they are being formed.

Figure 9:
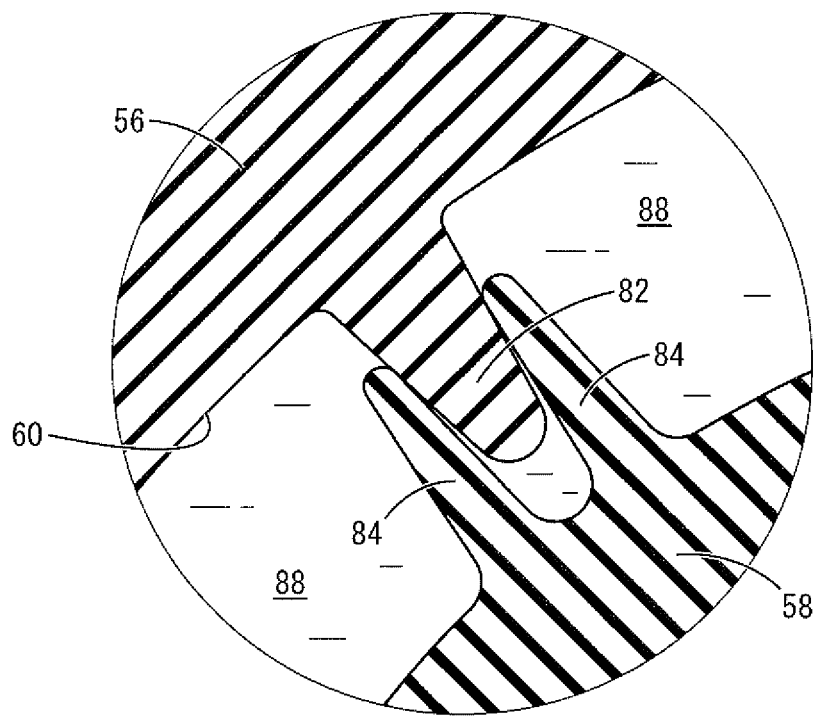
FIG. 9 is a partial cross section view of a principle part of an engine mount as a second embodiment of the present invention.

FIG. 9 shows a key portion of an engine mount as a second embodiment of the present invention. That is, in the present embodiment, the first division piece 82 and the second division pieces 84, 84 are overlapped and abutted against each other in the circumferential direction in the dividing walls 80, 80, which is equivalent to the structure of the first embodiment without the spaces 90, 90. In addition, the protrusion tips of the second division pieces 84, 84 are abutted against the middle portion of the first division piece 82 from each side in the circumferential direction, and the protrusion tips of the second division pieces 84, 84 are separated inward from the first rubber elastic body 56. Further, the protrusion tip of the first division piece 82 is separated outward from the second rubber elastic body 58. As to other portions not shown in the figures, the same structure as in the first embodiment can be adopted.

In the engine mount with the structure according to the present embodiment, since the first division piece 82 and the second division pieces 84, 84 are abutted against each other in advance, a fluid flow is generated efficiently via the second orifice passage 94 once a large-amplitude, low-frequency vibration is input in the axis-perpendicular direction, thus enabling to exert the intended vibration damping effect in a favorable manner.

Also, once a middle- to high-frequency, small-amplitude vibration is input, the liquid pressure absorption effect is exerted by having the dividing wall 80 composed of the first division piece 82 and the second division pieces 84, 84 elastically deformed in the circumferential direction, so that the vibration isolation effect due to the lowered dynamic spring is exerted. Moreover, the protrusion tip of the first division piece 82 is separated from the second rubber elastic body 58, while the protrusion tips of the second division pieces 84, 84 are separated from the first rubber elastic body 56, and deformation of the first and second division pieces 82, 84, 84 is easily generated with no restriction due to the friction with the first and second rubber elastic bodies 56, 58.

Additionally, in the present embodiment, the protrusion tips of the second division pieces 84, 84 are abutted against the middle portion of the first division piece 82, while the middle portions of the second division pieces 84, 84 are separated from the protrusion tip of the first division piece 82 in the circumferential direction. Thus, the overlapping faces of the first division piece 82 and the second division pieces 84, 84 are partially abutted against each other. Therefore, the binding forces exerted on each other between the first division piece 82 and the second division pieces 84, 84 are restricted, thus more easily generating a slight elastic deformation of the dividing wall 80.

Embodiments of the present invention have been described in detail above, but the present invention is not limited to those specific descriptions. For example, as long as the dividing wall 80 that separates the pair of axis-perpendicular liquid chambers 88, 88 is formed at two locations on the circumference, and the number of the first division piece 82 or the second division piece 84 composing each dividing wall 80 is not particularly limited.

Further, the two dividing walls need not have mutually the same structure and, for example, one dividing wall may have a structure with one first division piece 82 and one second division piece 84 overlapped with each other in the circumferential direction, while the other dividing wall may have a structure with one second division piece 84 inserted between two first division pieces 82, 82 to be overlapped with each other in the circumferential direction.

Another structure can also be adopted where the protrusion tip of the first division piece 82 is abutted against the outer face of the second rubber elastic body 58. Similarly, still another structure can be adopted where the protrusion tip of the second division piece 84 is abutted against the inner face of the first rubber elastic body 56.

Moreover, it is preferable that the first division piece 82 and the second division piece 84 are inclined at least on their overlapping faces gradually thinning out toward their protrusion tips, but at least one of the division pieces 82, 84, for example, can extend its both sides almost parallel to the direction of protrusion to make a protrusion with almost a constant thickness.

What is claimed is:

1. A fluid-filled vibration damping device comprising:
a first mounting member and a second mounting member attached to respective members constituting a vibration transmission system;
a main rubber elastic body elastically connecting the first mounting member and the second mounting member to each other;
a pressure-receiving chamber having a wall partially constituted by the main rubber elastic body, the pressure-receiving chamber having an internal pressure fluctuating based on vibration input in an axial direction;
an equilibrium chamber having a wall partially constituted by a flexible film, the flexible film allowing volume changes in the equilibrium chamber, the pressure-receiving chamber and equilibrium chamber being filled with a non-compressible fluid;
a first orifice passage connecting the pressure-receiving chamber and the equilibrium chamber to each other;
a pair of axis-perpendicular liquid chambers, each of the pair of axis-perpendicular liquid chambers having walls partially constituted by the main rubber elastic body, the pair of axis-perpendicular liquid chambers being formed on opposite sides of the first mounting member in an axis-perpendicular direction, the axis-perpendicular liquid chambers being filled with the non-compressible fluid; and a second orifice passage connecting the axis-perpendicular liquid chambers to each other, wherein the main rubber elastic body includes a first rubber elastic body and a second rubber elastic body which are separate elements from each other, the first rubber elastic body and the second rubber elastic body being overlapped in the axial direction, the axis-perpendicular liquid chambers are formed between the first rubber elastic body and the second rubber elastic body, a pair of dividing walls, which divide the axis-perpendicular liquid chambers, are constituted by: (i) at least one first division piece protruding from the first rubber elastic body toward the second rubber elastic body, and (ii) at least one second division piece protruding from the second rubber elastic body toward the first rubber elastic body, the at least one first division piece and the at least one second division piece being overlapped in a circumferential direction, the first rubber elastic body has a thickness, a diameter, and a spring constant that are each larger than a thickness, a diameter, and a spring constant of the second rubber elastic body, the first rubber elastic body having a tapered shape protruding outward in the axial direction, when the fluid-filled vibration damping device is mounted on the vibration transmission system, a static support load is input between the first mounting member and the second mounting member in a direction of getting closer to each other so as to compress the first rubber elastic body, and the first rubber elastic body and the second rubber elastic body are configured to elastically deform in response to a load between the first mounting member and the second mounting member.

2. A fluid-filled vibration damping device comprising:

a first mounting member and a second mounting member attached to respective members constituting a vibration transmission system;

a main rubber elastic body elastically connecting the first mounting member and the second mounting member to each other;

a pressure-receiving chamber having a wall partially constituted by the main rubber elastic body, the pressure-receiving chamber having an internal pressure fluctuating based on vibration input in an axial direction;

an equilibrium chamber having a wall partially constituted by a flexible film, the flexible film allowing volume changes in the equilibrium chamber, the pressure-receiving chamber and equilibrium chamber being filled with a non-compressible fluid;

a first orifice passage connecting the pressure-receiving chamber and the equilibrium chamber to each other;

a pair of axis-perpendicular liquid chambers, each of the pair of axis-perpendicular liquid chambers having walls partially constituted by the main rubber elastic body, the pair of axis-perpendicular liquid chambers being formed on opposite sides of the first mounting member in an axis-perpendicular direction, the axis-perpendicular liquid chamber being filled with the non-compressible fluid; and a second orifice passage connecting the axis-perpendicular liquid chambers to each other, wherein the main rubber elastic body includes a first rubber elastic body and a second rubber elastic body which are separated elements from each other, the first rubber elastic body and the second rubber elastic body being overlapped in the axial direction, the axis-perpendicular liquid chambers are formed between the first rubber elastic body and the second rubber elastic body, a pair of dividing walls, which divide the axis-perpendicular liquid chambers, are constituted by: (i) at least one first division piece protruding from the first rubber elastic body toward the second rubber elastic body, and (ii) at least one second division piece protruding from the second rubber elastic body toward the first rubber elastic body, the at least one first division piece and the at least one second division piece being overlapped in a circumferential direction, the first rubber elastic body has a thickness, a diameter, and a spring constant that are each larger than a thickness, a diameter, and a spring constant of the second rubber elastic body, the first rubber elastic body having a tapered shape protruding outward in the axial direction, when the fluid-filled vibration damping device is mounting on the vibration transmission system, a static support load is input between the first mounting member and the second mounting member in a direction of getting closer to each other so as to compress the first rubber elastic body, and a protrusion tip of the at least one first division piece is separated from the second rubber elastic body, and a protrusion tip of the at least one second division piece is separated from the first rubber elastic body.

3. A fluid-filled vibration damping device comprising:

a first mounting member and a second mounting member attached to respective members constituting a vibration transmission system;

a main rubber elastic body elastically connecting the first mounting member and the second mounting member to each other;

a pressure-receiving chamber having a wall partially constituted by the main rubber elastic body, the pressure-receiving chamber having an internal pressure fluctuating based on vibration input in an axial direction;

an equilibrium chamber having a wall partially constituted by a flexible film, the flexible film allowing volume changes in the equilibrium chamber, the pressure-receiving chamber and equilibrium chamber being filled with a non-compressible fluid;

a first orifice passage connecting the pressure-receiving chamber and the equilibrium chamber to each other;

a pair of axis-perpendicular liquid chambers, each of the pair of axis-perpendicular liquid chambers having walls partially constituted by the main rubber elastic body, the pair of axis-perpendicular liquid chambers being formed on opposite sided of the first mounting member in an axis-perpendicular direction, the axis-perpendicular liquid chambers being filled with the non-compressible fluid; and a second orifice passage connecting the axis-perpendicular liquid chambers to each other, wherein the main rubber elastic body includes a first rubber elastic body and a second rubber elastic body which are separate elements from each other, the first rubber elastic body and the second rubber elastic body being overlapped in the axial direction, the axis-perpendicular liquid chambers are formed between the first rubber elastic body and the second rubber elastic body, a pair of dividing walls, which divide the axis-perpendicular liquid chambers, are constituted by: (i) at least one first division piece protruding from the first rubber elastic body toward the second rubber elastic body, and (ii) at least one second division piece protruding from the second rubber elastic body toward the first rubber elastic body, the at least one first division piece and the at least one second division piece being overlapped in a circumferential direction, the first rubber elastic body has a thickness, a diameter, and a spring constant that are each larger than a thickness, a diameter, and a spring constant of the second rubber elastic body, the first rubber elastic body having a tapered shape protruding outward in the axial direction, when the fluid-filled vibration damped device is mounted on the vibration transmission system, a static support load is input between the first mounting member and the second mounting member in a direction of getting closer to each other so as to compress the first rubber elastic body, and the at least one first division piece and the at least one second division piece, which constitute the dividing wall, are separated from each other in the circumferential direction, and a space is formed between overlapping faces of the at least one first division piece and the at least one second division piece.

4. The fluid-filled vibration damping device according to claim 1, wherein overlapping faces of the at least one first division piece and the at least one second division piece are inclined toward a direction of protrusion of the at least one first division piece and the at least one second division piece, and the at least one first division piece and the at least one second division piece are gradually thinned out toward each protruding tip.

5. The fluid-filled vibration damping device according to claim 1, wherein at least one of the at least one first division piece and the at least one second division piece of the dividing wall includes a plurality of division pieces, and the at least one first division piece and the at least one second division piece are alternately arranged and overlapped in the circumferential direction.

6. The fluid-filled vibration damping device according to claim 1, wherein the at least one first division piece is overlapped with the at least one second division piece for at least half of a protrusion length of the at least one first division piece, and the at least one second division piece is overlapped with the first division piece for at least half of a protrusion length of the at least one second division piece.

* * * * *